United States Patent [19]

Budic

[11] 4,053,988

[45] Oct. 18, 1977

[54] ECCENTRICITY MEASURING DEVICE

[75] Inventor: Kenneth A. Budic, Wauwatosa, Wis.

[73] Assignee: Will Ross, Inc., Milwaukee, Wis.

[21] Appl. No.: 691,054

[22] Filed: May 28, 1976

[51] Int. Cl.² .............................................. G01B 5/25
[52] U.S. Cl. .................................................. 33/174 Q
[58] Field of Search ................. 33/174 R, 174 Q, 191, 33/143 M, 143 R, 200

[56] References Cited

U.S. PATENT DOCUMENTS

| 601,721 | 5/1898 | Vine | 33/147 J |
|---|---|---|---|
| 1,935,175 | 11/1933 | Clement | 33/200 |
| 2,197,139 | 4/1940 | Warner | 33/200 |
| 2,515,214 | 7/1950 | Goldberg | 33/143 M |

Primary Examiner—Harry N. Haroian
Attorney, Agent, or Firm—John A. Dhuey

[57] ABSTRACT

A device for obtaining a measure of the eccentricity of an object is described and comprises a base support member for an object, a scale on the base extending from a center point of the object, and scale extensions operable to contact the outermost portions of the object.

3 Claims, 3 Drawing Figures

ECCENTRICITY MEASURING DEVICE

This invention is concerned with measuring devices. More particularly, it is concerned with a measuring device useful for determining the eccentricity of an object and manifesting such measure in an eccentricity index.

The invention will be described with reference to an embodiment which has been found to be particularly useful for determining the eccentricity of endotracheal, catheter, and tracheostomy tube inflation cuffs. However, its application for use with other objects will be apparent from the following description in which.

Figure 1:
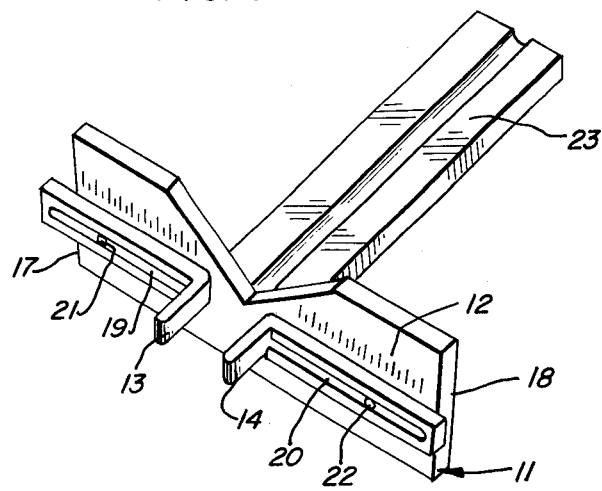
FIG. 1 is a perspective view of the measuring device.
Figure 2:
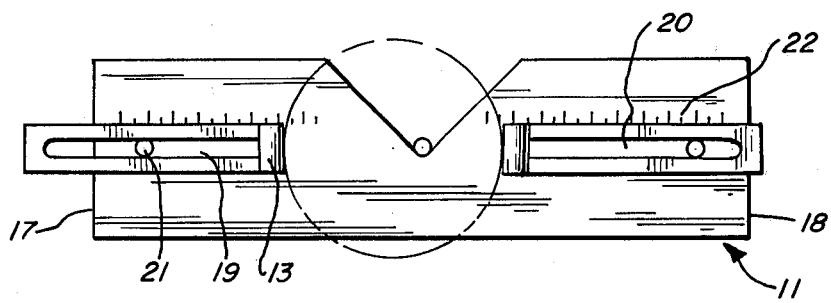
FIG. 2 is a front view of the device.
Figure 3:
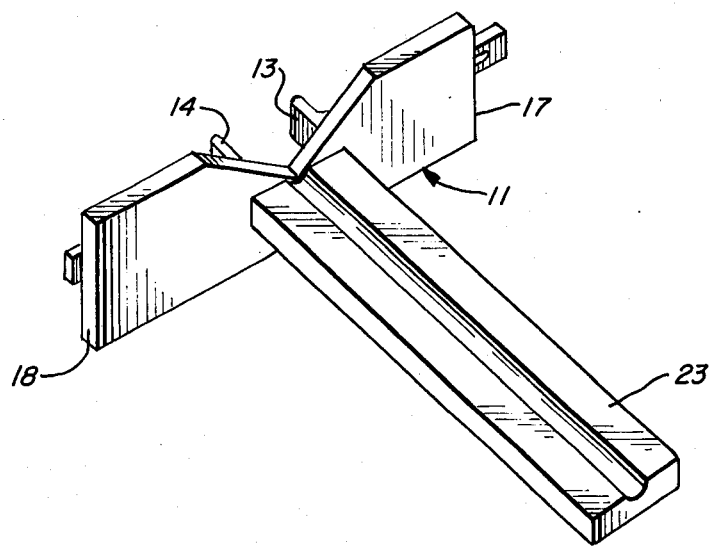
FIG. 3 is a perspective view of the backside of the device.

The device is formed from a base 11 upon which is scribed a scale 12. Movable along scale 12 are two scale extensions, measuring heads 13 and 14, which are perpendicular to scale 12.

Scale 12 originates from a central point on base 11 and extends toward each of the ends 17, 18 of base 11. Any convenient division can be used along the scale depending on the degree of accuracy required in a particular application. Typically, the scale is set out in millimeters, which has been satisfactory in applications involving endotracheal tubes and catheters.

In use an object is placed on the originating point of scale 12, such that it rests upon base 11, usually in a position at which the outermost portion of the object, when measured from its central axis, lies along the scale. Alternatively, the object can be placed on the base and rotated until the largest reading in one direction on the scale is reached. Then the measuring heads 13 and 14 are moved inwardly along scale 12 until they come in contact with the outer surface of the object. Readings from scale 12 are then taken and the larger reading is divided by the smaller reading to give an index of eccentricity as a numerical value.

Although the present invention has been illustrated with a device having two measuring heads, it is apparent that one movable measuring head can be used on a scale extending in one direction from a point of origin. To obtain an eccentricity index in this alternate embodiment, the object is measured at one point corresponding to the outermost point from the axis of the object. Then the object is rotated 180° about its axis and another reading taken. Division of the higher reading by the lower again gives a numerical index of eccentricity.

In a particularly preferred embodiment of this invention, base 11 is rectangular, having a large V-shaped groove 24 extending to the origin of scale 12. Scale 12 extends in both directions from the point of origin along base 11. Mounted on base 11 are two right-angular measuring heads 13 and 14. The bottom portions of the measuring heads have grooves 19 and 20 formed therein. Retaining pins 21 and 22 support the measuring head on base 11 and permit the heads to slide along the scale. A support member 23 is attached to the backside of the base member near the bottom of the groove. Member 23 also has a V-shaped groove 25 formed therein to locate the catheter balloon at the scale origin.

Measuring heads 13 and 14 may be biased in a direction toward the scale origin, as for example, by spring means within grooves 19 and 20. The biasing action automatically moves the measuring head to the outer surface of the object. Then the appropriate scale readings are taken and the eccentricity index calculated as described hereinbefore.

The invention has been described with reference to the above disclosure for illustration purposes. It is apparent that numerous modifications can be made without departing from the spirit and scope of the invention.

What is claimed is:

1. A device for measuring eccentricity of an object comprising:

a base for supporting said object to be measured;

a scale on said base for indicating a measure of said object;

a measuring head supported on said base perpendicular to said scale and movable along said scale for contacting an outermost portion of said object;

a support member perpendicular to said base and extending outwardly from the backside of said base;

a first groove on said base at the origin of said scale; and a second groove on said support member aligned with said first groove and extending substantially the length of said support member, whereby said grooves serve to locate said object at the origin of said scale.

2. A device as in claim 1 further comprising a second measuring head supported on said base perpendicular to said scale, said measuring heads being movable from a first position at the outermost ends of said base to a second position in contact with the outermost portions of said object.

3. A device as in claim 2 wherein said grooves are V-shaped.

* * * * *